United States Patent [19]

Kato

[11] Patent Number: 6,127,059
[45] Date of Patent: Oct. 3, 2000

[54] GAS DIFFUSION LAYER FOR SOLID POLYMER ELECTROLYTE FUEL CELL

[75] Inventor: Hiroshi Kato, Okayama, Japan

[73] Assignee: Japan Gore-Tex Inc., Tokyo, Japan

[21] Appl. No.: 09/040,072

[22] Filed: Mar. 17, 1998

[30] Foreign Application Priority Data

Mar. 17, 1997 [JP] Japan .................................. 9-063020

[51] Int. Cl.$^7$ ...................................... H01M 4/86
[52] U.S. Cl. .................. 429/40; 429/41; 429/42; 429/44; 204/283; 204/290 R; 204/294; 204/296
[58] Field of Search .................. 429/40, 41, 42, 429/44; 204/296, 290 R, 283, 294

[56] References Cited

U.S. PATENT DOCUMENTS

| 4,248,682 | 2/1981 | Lindstrom et al. | 204/114 |
| 4,293,396 | 10/1981 | Allen et al. | 204/106 |
| 4,647,359 | 3/1987 | Lindstrom | 204/294 |
| 4,894,355 | 1/1990 | Takeuchi et al. | 429/42 |
| 5,308,465 | 5/1994 | Hillrichs et al. | 429/41 |
| 5,399,184 | 3/1995 | Harada | 29/623.4 |
| 5,521,020 | 5/1996 | Dhar | 429/142 |

FOREIGN PATENT DOCUMENTS

| 0 577 291 A1 | 1/1994 | European Pat. Off. . |
| 0 687 023 A1 | 12/1995 | European Pat. Off. . |
| 58-165254 | 9/1983 | Japan . |
| 97/13287 | 4/1997 | WIPO . |
| 97/20358 | 6/1997 | WIPO . |

OTHER PUBLICATIONS

T. E. Springer, M. s. Wilson, S. Gottesfeld, "Modeling and Experimental Diagnostics in Polymer Electrolyte Fuel Cells"; J. Electrochem. Soc., vol. 140, No. 12, Dec. 1993, pp. 3513–3525.

European Search Report for EP 98301992.

Mosdale et al., "High Performance Electroldes for Hydrogen/Air PEMFC Operating at Atmostpheric Pressure", Electrochemical Society Proceedings, vol. 95–23, pp. 48–56. No Month/Year Available.

*Primary Examiner*—Bruce F. Bell
*Attorney, Agent, or Firm*—Allan M. Wheatcraft

[57] ABSTRACT

A gas diffusion layer for a solid polymer electrolyte fuel cell having a solid polymer electrolyte and a catalyst layer disposed adjacent to the solid polymer electrolyte, where the gas diffusion layer includes a carbon fiber woven cloth having a surface and a coating of a fluororesin (such as polytetrafluoroethylene) containing carbon black on the surface, wherein the carbon fiber woven cloth is adapted to be disposed in the solid polymer electrolyte fuel cell such that the coating is adjacent to the catalyst layer in the solid polymer electrolyte fuel cell. Preferably, the coating penetrates no more than one-half the thickness of the carbon fiber woven cloth. Most preferably, the coating penetrates no more than one-third the thickness of the carbon fiber woven cloth. The carbon fiber woven cloth may be pre-treated with a water-repellent fluororesin (such as polytetrafluoroethylene), or with a mixture of a fluororesin and carbon black, to enhance water repellency. In another aspect, the invention provides a solid polymer electrolyte fuel cell including a solid polymer electrolyte having first and second surfaces, a catalyst layer disposed on each of the first and second surfaces, and the gas diffusion layer of this invention disposed adjacent to said catalyst layer disposed on each of the first and second surfaces.

8 Claims, 3 Drawing Sheets

GAS DIFFUSION LAYER FOR SOLID POLYMER ELECTROLYTE FUEL CELL

FIELD OF THE INVENTION

The present invention relates to a gas diffusion layer material for use in a solid polymer electrolyte fuel cell that makes use of a membrane electrode assembly of the type in which a catalyst layer is formed on the surface of a solid polymer electrolyte membrane.

BACKGROUND OF THE INVENTION

Electrodes produced by the following methods have been proposed in the past as electrodes for electrochemical apparatuses in which a solid polymer electrolyte is used.

(1) A layer composed of a mixture of polytetrafluoroethylene (PTFE) or another such water-repellent binder and carbon black is formed on the surface or in the internal voids of carbon paper or the like that has undergone a water repellency treatment with PTFE or the like, and a catalyst layer is formed on the surface of this first layer, after which this product is joined with a solid polymer electrolyte membrane by hot pressing or the like.

(2) A paste-like or ink-like liquid, obtained by mixing a PTFE dispersion with a catalyst substance, or by mixing a solid polymer electrolyte resin solution, or a resin solution of a precursor substance thereof, with a catalyst substance, is directly applied to a solid polymer electrolyte membrane, and this coating is dried, heated, and molded, or is further molded by hot pressing.

(3) A paste-like or ink-like liquid, obtained by mixing a PTFE dispersion with a catalyst substance, or by mixing a solid polymer electrolyte resin solution, or a resin solution of a precursor substance thereof, with a catalyst substance, is applied over a release sheet, such as a PTFE sheet, and this coating is dried and heated, and the catalyst layer thus formed is joined by hot pressing or the like to a solid polymer electrolyte membrane, after which the release sheet is peeled off.

The present invention relates to a gas diffusion layer/collector that is used for a solid polymer electrolyte membrane electrode assembly formed by Method 2 or 3 above, or by a similar method.

Materials known in the past for use in a gas diffusion layer/collector such as this comprised carbon paper, or carbon paper that had undergone a water repellency treatment, or a layer composed of carbon black mixed with a fluororesin (used as a binder/water repellant) and formed on the surface of this carbon paper, or this mixture packed into the pores of carbon paper.

The use of carbon fiber woven cloth in place of this carbon paper has also been suggested (eg, U.S. Pat. No. 4,647,359 and Japanese Laid-Open Patent Application 58-165254).

However, a drawback to the known gas diffusion layers/collectors discussed above was that, although the conductivity in the surface direction was good since carbon paper has a structure in which carbon fibers are linked together with carbon, the conductivity in the thickness direction was lower than that in the surface direction. As to the mechanical properties, the rigidity was high, but the material was relatively brittle and had poor elasticity, so when more than a certain amount of pressure was applied in an attempt to ensure good electrical contact, the structure readily broke and the conductivity and air permeability decreased. Furthermore, although the structure of carbon paper did result in good air permeability in the thickness direction, the air permeability in the surface direction was not very good, so not much gas diffusion in the surface direction could be expected. Consequently, gas diffusion was blocked by the rib protrusions that formed the gas channel in the fuel cell separator, and as a result, there was a decrease in cell performance.

A carbon fiber woven cloth, on the other hand, is pliant, with none of the mechanical brittleness mentioned above, and depending on the fiber structure and how the material is folded, it is possible to impart resilience in the thickness direction. However, a carbon fiber woven cloth has unstable electrical contact, that is, resistance, because the fibers are not fixed, and there is also the danger that excessive pliancy will result in a loss of the form of contact with the electrolyte or catalyst electrode. In view of this, it has been proposed that a mixture composed of a fluororesin and carbon black be completely packed into the voids of a carbon fiber woven cloth when a conventional carbon fiber woven cloth is used, as discussed in U.S. Pat. No. 4,647,359 and Japanese Laid-Open Patent Application 58-165254. This method does indeed afford a certain amount of rigidity and stable conductivity, but because the voids are packed with a fluororesin and carbon black, which have poor gas permeability, the gas diffusion is particularly bad in the surface direction, so the advantage of using a carbon fiber woven cloth is lost.

These gas diffusion layers/collectors have been investigated in conjunction with fuel cells that make use of an electrolytic solution, and more specifically, primarily phosphoric acid types of fuel cells. Accordingly, the materials need to function not only as a gas diffusion layer, but also as an electrode, and have been proposed as materials having a catalyst in their structure. Therefore, these materials have not been studied for use in solid polymer electrolyte fuel cells that do not make use of an electrolytic solution, and so did not necessarily have an optimal structure for a gas diffusion layer/collector.

The inventors arrived at the present invention as a result of investigation into a gas diffusion layer/collector that can be mass produced easily and that can be used optimally in a fuel cell not of a conventional type in which a electrolytic solution is used as discussed above, but rather of a type in which a solid polymer electrolyte is used, and of a type in which a catalyst layer is joined ahead of time with a solid electrolyte membrane, that is, a type in which the above-mentioned membrane electrode junction (2) or (3) is used.

SUMMARY OF THE INVENTION

Because the electrolyte is solid in a solid polymer electrolyte fuel cell, if the fuel cell is a type that makes use of the type of membrane electrode junction in (2) or (3) above, since the ion conductivity between the catalyst layer and the electrolyte membrane is already ensured, the electrode does not need to be all that rigid as long as electrical contact is sufficiently ensured, and it is actually more important that the gas diffusion layer have good drainage of the product water and humidifying water that serves to ensure good gas diffusion and ion conductivity over the entire surface. In light of this, the present invention focused on a carbon fiber woven cloth, which intrinsically has good gas diffusion in the surface direction, is mechanically pliant, and is resistant to compression, which therefore ensures good electrical contact in use in a fuel cell, and this led to the inventors perfecting the present invention. Specifically, the present invention provides the following:

a gas diffusion layer for a solid polymer electrolyte fuel cell having a solid polymer electrolyte and a catalyst layer disposed adjacent to the solid polymer electrolyte, where the gas diffusion layer includes a carbon fiber woven cloth having a surface and a coating of a fluororesin (such as polytetrafluoroethylene) containing carbon black on the surface, wherein the carbon fiber woven cloth is adapted to be disposed in the solid polymer electrolyte fuel cell such that the coating is adjacent to the catalyst layer in the solid polymer electrolyte fuel cell. Preferably, the coating penetrates no more than one-half the thickness of the carbon fiber woven cloth. Most preferably, the coating penetrates no more than one-third the thickness of the carbon fiber woven cloth. The carbon fiber woven cloth may be pre-treated with a water-repellent fluororesin (such as polytetrafluoroethylene), or with a mixture of a fluororesin and carbon black, to enhance water repellency.

In another aspect, the invention provides a solid polymer electrolyte fuel cell including a solid polymer electrolyte having first and second surfaces, a catalyst layer disposed on each of the first and second surfaces, and the gas diffusion layer of this invention disposed adjacent to said catalyst layer disposed on each of the first and second surfaces.

DETAILED DESCRIPTION OF THE INVENTION

Figure 1:
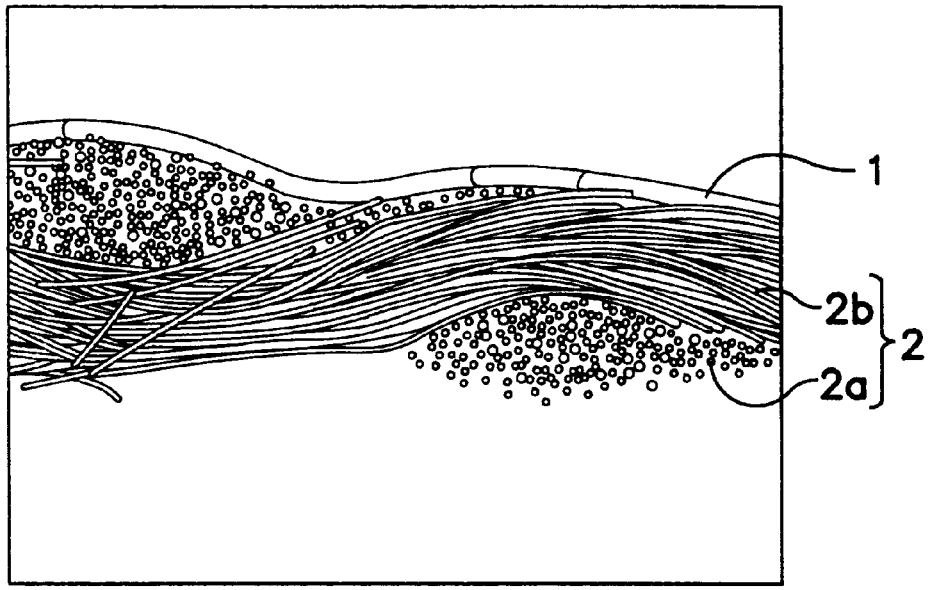
FIG. 1 is a schematic based on a cross sectional micrograph illustrating the structure of a carbon fiber woven cloth having a surface layer that is the gas diffusion layer of the practical example.

The term "carbon fiber woven cloth" here refers to the product of weaving carbon fiber yarns. The carbon fiber yarns can be long fibers, the product of bundling these into the form of yarns, or the like, but the use of so-called spun yarns, in which these fibers are twisted, is ideal. This material does not necessarily have to be the product of weaving carbon fibers, and may also comprise precursor fibers that can be carbonized, or may be these [precursor fibers] that have been woven and then carbonized. An example of a carbon fiber woven cloth such as this is "AvCarb®" made by the U.S. firm of Textron Specialty Materials, but other materials can also be used. There are no particular restrictions on how this cloth is woven or knitted, the structure of the yarns, and so on. From the standpoints of the above-mentioned gas diffusion, conductivity, and the like, the thickness of the cloth should be from 0.1 to 1 mm.

The layer composed of a fluororesin and carbon black that is formed on the surface of the carbon fiber woven cloth prevents the flooding of the catalyst layer by the product water or humidification water during the operation of the fuel cell, rapidly supplies and removes the reaction gas, efficiently transmits the generated electricity to the carbon fiber woven cloth (which also serves as a collector), and serves as a buffer layer that prevents the carbon fibers of the carbon fiber woven cloth from puncturing or breaking the catalyst layer or the solid polymer electrolyte membrane, and therefore needs to be a porous layer that is water repellent and electrically conductive and has a fairly smooth surface.

An important point in the present invention is that this layer not penetrate more than one-half, and preferably no more than one-third, of the thickness of the carbon fiber woven cloth. If it penetrates any further, it will block the voids that serve as the gas channel in the surface direction of the carbon fiber woven cloth, and there will be a corresponding drop in gas diffusion performance. Naturally, there will also be a decrease in gas diffusion performance if this layer is itself too thick. From the standpoints of gas diffusion and conductivity, it is preferable for this layer to be as thin as possible, but in terms of ensuring electrical contact with the catalyst layer, and ensuring that the layer will function as a buffer layer, a range of 5 to 100 $\mu$m is suitable, with 10 to 40 $\mu$m being even better.

This layer may be formed as follows. A mixture of carbon black and a fluororesin (a water-repellent binder) is made into a paste using water as a dispersant, after which this paste is used to coat a release film (such as a fluororesin), and the above-mentioned carbon fiber woven cloth is placed over the surface of this and heated, which integrally molds the assembly, after which the release film is peeled off. Alternatively, a carbon fiber woven cloth that has undergone a water repellency treatment so that the above-mentioned paste will not permeate into the woven cloth may be directly coated and dried, after which this product is heat treated, which forms the desired layer on the surface thereof. The water repellency treatment here can be accomplished using a fluororesin or another such water-repellent resin, or a common water repellant, or a mixture of this with carbon black (used as a conductive material), or the like, but the amount applied much be kept low enough that the voids between the carbon fibers will not be blocked. Since this treatment fixes the nodes between the fibers in the cloth to a certain extent, it also allows the rigidity of the cloth to be raised. It is also possible to mold a sheet from a fluororesin and carbon black, and then join this to a carbon fiber woven cloth.

Regardless of the method employed, the mixing proportions (weight ratio) of the fluororesin and carbon black that make up the layer composed of a fluororesin and carbon black is set between 10:90 and 60:40, and preferably between 20:80 and 50:50. If the amount of the fluororesin is less than this, sufficient water repellency will not be obtained, the voids will be blocked by the product water and the like, and gas diffusion will be hindered. If the amount of carbon black is less than this, sufficient conductivity will not be obtained, and the percentage of void will also decrease, which interferes with gas diffusion.

The term "fluororesin" here refers to a resin that is water-repellent and contains fluorine in its structure, such as PTFE, PFA, FEP, and ETFE. Meanwhile, as long as it is a material that is composed of carbon and has conductivity, any material can be used as the carbon black, including graphite. The carbon black may be carbon staple fibers, or may be a mixture of these.

The gas diffusion layer material of the present invention is used in fuel cells that make use of a solid polymer electrolyte having an integrally formed catalyst layer, and the following are typical examples of this solid polymer electrolyte having an integrally formed catalyst layer, although other types are also possible.

A paste-like or ink-like liquid, obtained by mixing a PTFE dispersion with a catalyst substance, or by mixing a solid polymer electrolyte resin solution, or a resin solution of a precursor substance thereof, with a catalyst substance, is directly applied to a solid polymer electrolyte membrane, and this coating is dried, heated, and molded, or is further molded by hot pressing (2);

a paste-like or ink-like liquid, obtained by mixing a PTFE dispersion with a catalyst substance, or by mixing a solid polymer electrolyte resin solution, or a resin solution of a precursor substance thereof, with a catalyst substance, is applied over a release sheet, such as a PTFE sheet, and this coating is dried and heated, and the catalyst layer thus formed is joined by hot pressing or the like to a solid polymer electrolyte membrane, after which the release sheet is peeled off (3); or a solid polymer electrolyte membrane electrode junction is molded by a method similar to those above.

A favorable example is discussed in Japanese Laid-Open Patent Application 8-162132. Specifically, this is a solid polymer electrolyte/electrode junction characterized by the fact that a solid polymer electrolyte composed of drawn porous polytetrafluoroethylene and a macromolecular electrolyte resin that is contained in the pores thereof is integrally formed on the surface of an electrode, or an electrode/solid polymer electrolyte/electrode junction in which electrodes are integrally formed on both sides of a solid polymer electrolyte.

The present invention will now be described through practical examples.

PRACTICAL EXAMPLES

In all of the following practical examples, the membrane electrode (catalyst layer) assembly included Gore Select™ (20 µm thickness), available through Japan Gore-Tex, which was impregnated with perfluorosulfonic acid resin and used as the solid electrolyte membrane, and a platinized carbon in perfluorosulfonic acid resin (Pt: 0.3 mg/cm$^2$), which was used as the catalyst layer (electrode). The Gore Select membrane was sandwiched between two catalyst layers and hot-pressed, which joined the catalyst layers to both sides of the Gore Select, and these sides were used as the anode and cathode. The membrane/electrode assembly is available from Japan Gore-Tex under the trademark PRIMEA™.

Practical Example 1

The carbon fiber woven cloth used here had a thickness of approximately 40 microns (AvCarb®) and was woven in a plain weave using yarns of 45 bundled filaments with a diameter of 7.5 microns. A dispersion for the water repellency treatment of this cloth was readied by thoroughly mixing 50 g of carbon black (acetylene black, available from Denkikagakukogyo Kabushikikaisha under the trademark "Denka Black") and 25 g (resin component) of a PTFE dispersion (55% solids, available from Daikin Industries, Ltd. under the trademark "D-1") with 1 L of water to which about 5 wt % nonionic surfactant (available from Union carbide Corp. under the trademark "Triton X-100") had been added, and the above-mentioned carbon fiber woven cloth was immersed in this dispersion. The excess liquid was squeezed out of the carbon fiber cloth by nipping the cloth with rubber rolls. The cloth was then air dried, after which it was heated for 30 minutes at 370° C. to melt the PTFE, which fixed the carbon black and carbon fibers and, at the same time, decomposed and removed the surfactant, and this yielded a water-repellent carbon fiber woven cloth.

Next, 15 g of the same carbon black and 7 g (resin component) of the same PTFE dispersion were added to 100 g of water that again contained the same amount of the same nonionic surfactant, and these components were thoroughly dispersed to obtain a dispersion. This dispersion was dripped onto the water-repellent carbon fiber woven cloth readied previously, and after it had been confirmed that the dispersion did not seep into the woven cloth, a thin coat was brushed onto the surface of the water-repellent carbon fiber woven cloth. 150° C. hot air was directed at this product to remove the water, and this product was heat treated for 40 minutes at 370° C., which formed a water-repellent conductive porous layer composed of PTFE and carbon black on the surface of the carbon fiber woven cloth, and yielded the gas diffusion layer material of a practical example of the present invention.

It was confirmed from a cross sectional micrograph (×100) of the gas diffusion layer in this practical example of the present invention that the layer 1 composed of PTFE and carbon black only slightly penetrated the carbon fiber woven cloth 2 composed of warp yarns 2a and weft yarns 2b, penetrating no more than one-third of the carbon fiber woven cloth. FIG. 1 is a schematic based on this cross sectional micrograph. The extent to which the layer composed of PTFE and carbon black penetrates the carbon fiber woven cloth can be adjusted by selection of the conditions in the water repellency treatment of the carbon fiber woven cloth and so on.

Figure 2:
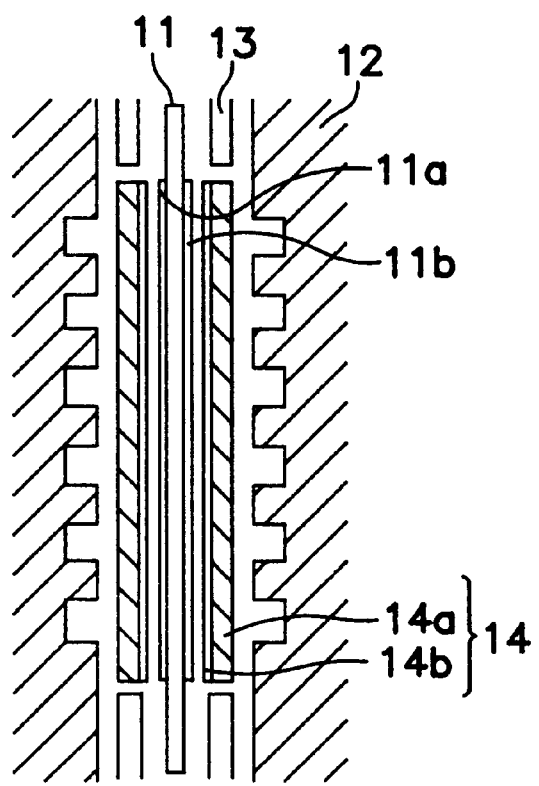
FIG. 2 illustrates a single-cell solid polymer electrolyte fuel cell that incorporates a gas diffusion layer.
Figure 3:
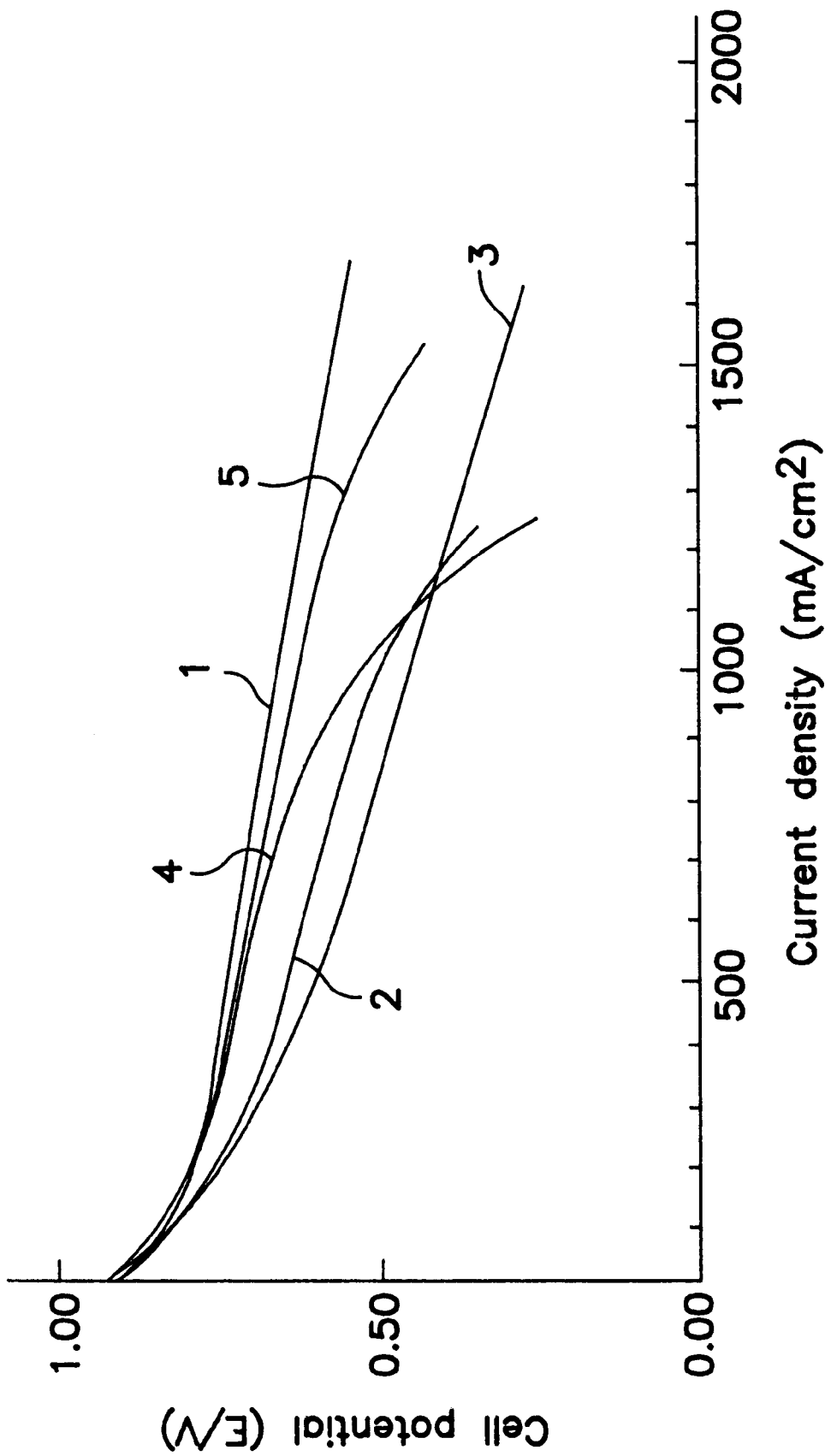
FIG. 3 shows the results of a performance test for the single-cell solid polymer electrolyte fuel cells in Practical Example 1 and Comparative Examples 1 through 4.

Next, a single-cell solid polymer electrolyte fuel cell, which incorporated the gas diffusion layer of the present invention, was put together as shown in FIG. 2 using the above-mentioned junction (gas diffusion layer/collector) comprising a catalyst layer joined to both sides of Gore Select, and the following performance test was conducted, the results of which are given in FIG. 3 (1).

In FIG. 2, the above-mentioned gas diffusion layer/collector 14 was positioned on both sides of a membrane/electrode junction 11 in which the catalyst layers 11a and 11b were integrated, this was sandwiched between separators 12, and a single-cell solid polymer electrolyte fuel cell was assembled according to conventional assembly techniques. The gas diffusion layer/collector 14 had the water-repellent conductive layer 14b on the inside, and the carbon fiber cloth 4a on the outside. Gas channels were formed in the separators 12. 13 is a gasket.

A performance test was conducted using this cell, which was operated at a cell temperature of 70° C., an anode/cathode gas humidification temperature of 70° C., and a gas pressure of atmospheric pressure, and using hydrogen and air as the gas.

Comparative Example 1

This example was the same as Practical Example 1, except that carbon paper that had a thickness of 180 microns and that had undergone a water repellency treatment was used as the gas diffusion layer. The single cell thus obtained was evaluated, the results of which are given in FIG. 3 (2).

Comparative Example 2

This example was the same as Practical Example 1, except that the water repellency-treated carbon fiber woven cloth used in Practical Example 1 was used as the gas diffusion layer without first having a layer composed of a fluororesin and carbon black formed on its surface. The single cell thus obtained was evaluated, the results of which are given in FIG. 3 (3).

Comparative Example 3

Other than using water repellency-treated carbon paper instead of a carbon fiber woven cloth, a gas diffusion layer was produced in the same manner as in Practical Example 1. The single cell thus obtained was evaluated, the results of which are given in FIG. 3 (4).

Comparative Example 4

A commercially available gas diffusion layer material (ELAT® made by the U.S. firm of E-TEK) having, a structure in which a carbon fiber woven cloth was packed throughout its thickness direction with a water-repellent conductive material was used as the gas diffusion layer in Practical Example 1. The single cell thus obtained was evaluated, the results of which are given in FIG. 3 (5).

Practical Example 2 and Comparative Example 5

Figure 4:
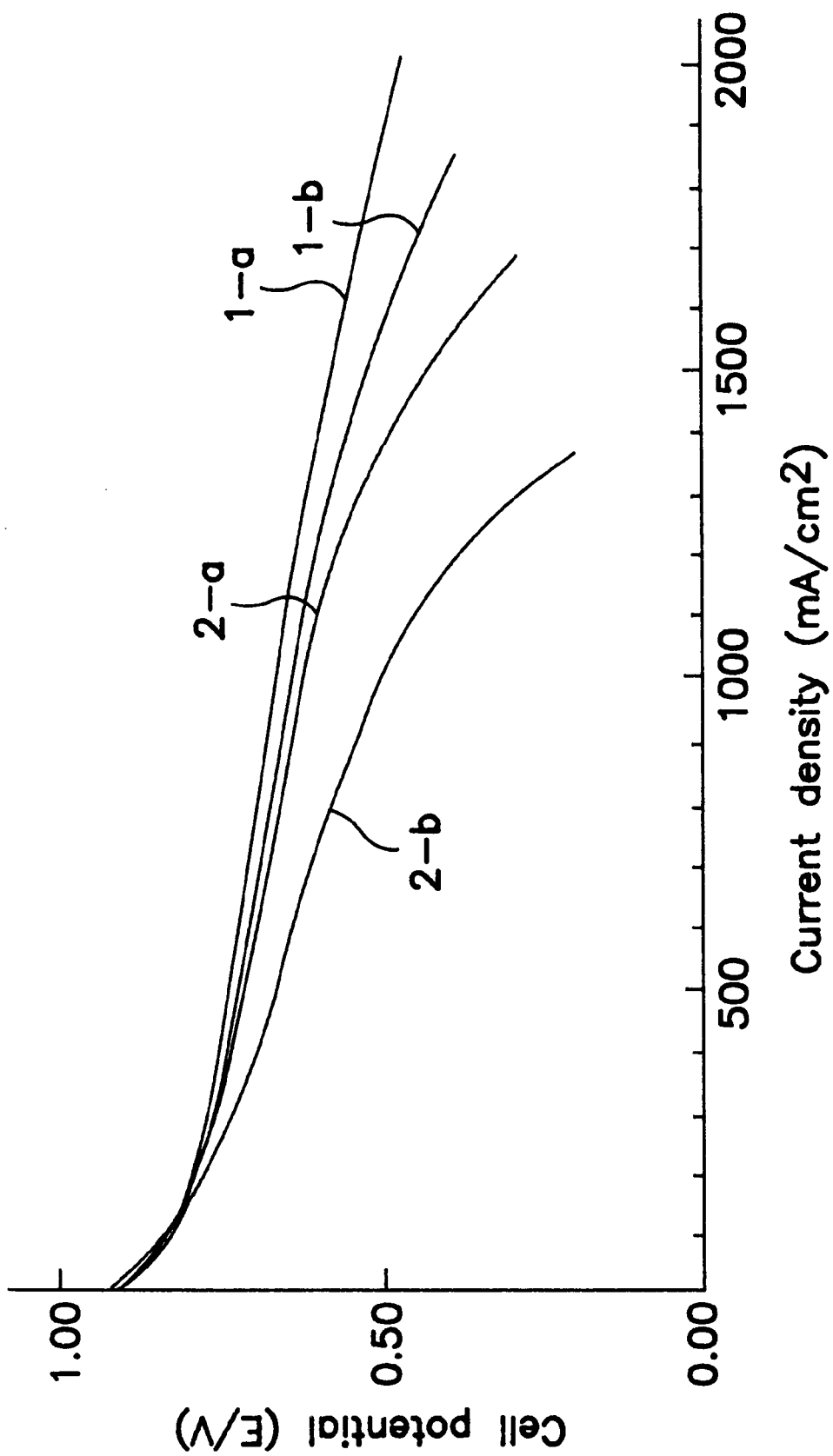
FIG. 4 shows the results of a performance test for the single-cell solid polymer electrolyte fuel cells in Practical Example 2 and Comparative Example 5.

The single cell evaluations conducted in Practical Example 1 and Comparative Example 4 were evaluated by varying the utilization rate of the reaction gas (conditions A: 50% hydrogen utilization rate, 30% air utilization rate; conditions B: 80% hydrogen utilization rate, 50% air utilization rate), and the results thus obtained (Practical Example 2 and Comparative Example 5) are shown in FIG. 4 as (1)-a, (1)-b, (2)-a, and (2)-b, respectively.

It can be seen from these results that when the cell potential was 0.6 V, performance only decreased by about 10% with the product of the present invention even at a high reaction gas utilization rate, whereas the performance dropped to almost 50% with the gas diffusion layer material of Comparative Example 4. In other words, the good gas diffusion capability of the product of the present invention was corroborated.

The present invention provides a gas diffusion layer material for a solid polymer electrolyte fuel cell, which has good gas diffusion in the surface direction, is mechanically pliant, and is resistant to compression, which therefore ensures good electrical contact.

We claim:

1. A gas diffusion layer for a solid polymer electrolyte fuel cell having a solid polymer electrolyte and a catalyst layer disposed adjacent to the solid polymer electrolyte, the gas diffusion layer comprising a carbon fiber woven cloth having a surface and a coating of a fluororesin containing carbon black on said surface.

2. A gas diffusion layer as defined in claim 1, wherein the carbon fiber woven cloth is pre-treated with a water-repellent fluororesin.

3. A gas diffusion layer as defined in claim 2, wherein said water-repellent fluororesin is polytetrafluoroethylene.

4. A gas diffusion layer as defined in claim 1, wherein the carbon fiber woven cloth is pre-treated with a mixture of a fluororesin and carbon black to enhance water repellency.

5. A gas diffusion layer as defined in claim 1, wherein said fluororesin is polytetrafluoroethylene.

6. A solid polymer electrolyte fuel cell comprising a solid polymer electrolyte having first and second surfaces, a catalyst layer disposed on each of said first and second surfaces, and a gas diffusion layer as defined in claim 1 disposed adjacent to said catalyst layer disposed on each of said first and second surfaces.

7. In a solid polymer electrolyte fuel cell comprising a solid polymer electrolyte having first and second surfaces and a catalyst layer disposed upon each of said first and second surfaces, the improvement comprising a gas diffusion layer as defined in claim 1 disposed adjacent to said catalyst layer disposed on each side of said first and second surfaces.

8. A method of diffusing gas in a solid polymer electrode and a catalyst layer disposed adjacent to the solid polymer electrolyte, said method comprising the steps of:

(a) providing a carbon fiber woven cloth having a surface;

(b) forming a coating of a fluororesin containing carbon black on said surface; and (c) disposing said carbon fiber woven cloth in the solid polymer electrolyte fuel cell such that said coating is adjacent to said catalyst layer and such that gas diffuses in a surface direction along said carbon fiber media.

* * * * *